A. SUNDH.
LUBRICATING MECHANISM.
APPLICATION FILED APR. 4, 1912.
1,132,748.  Patented Mar. 23, 1915.
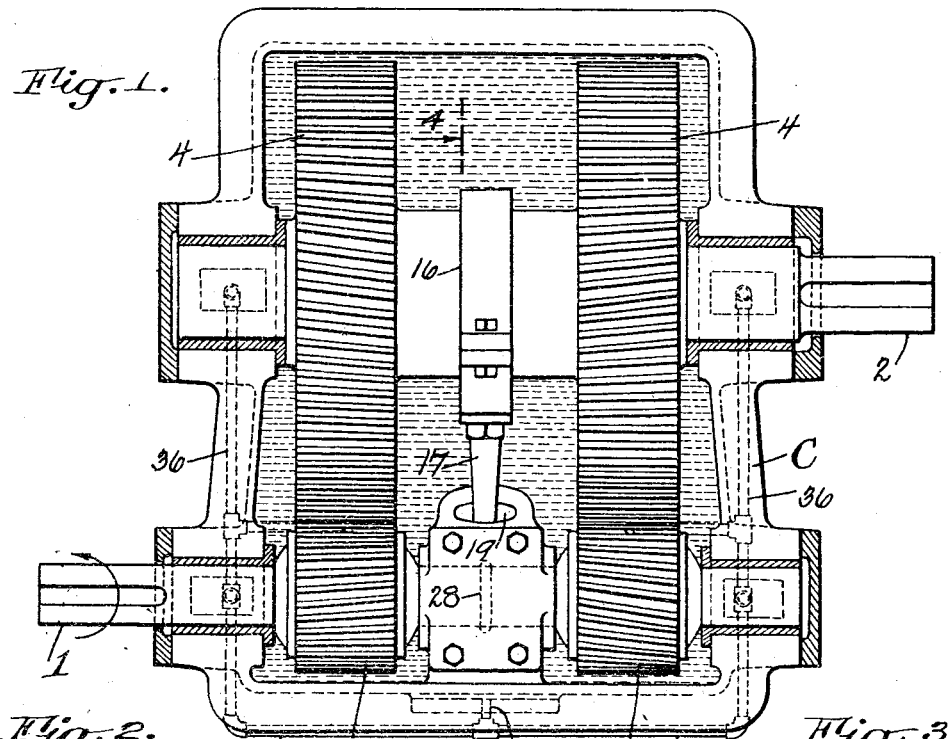
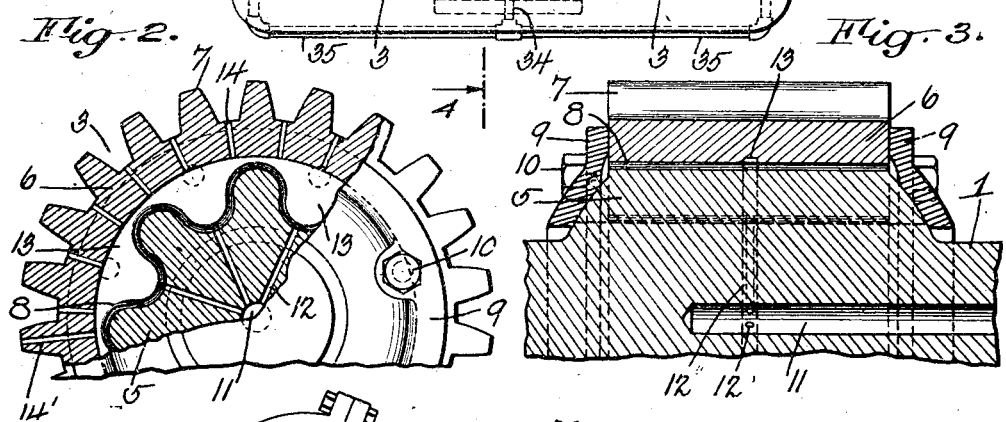
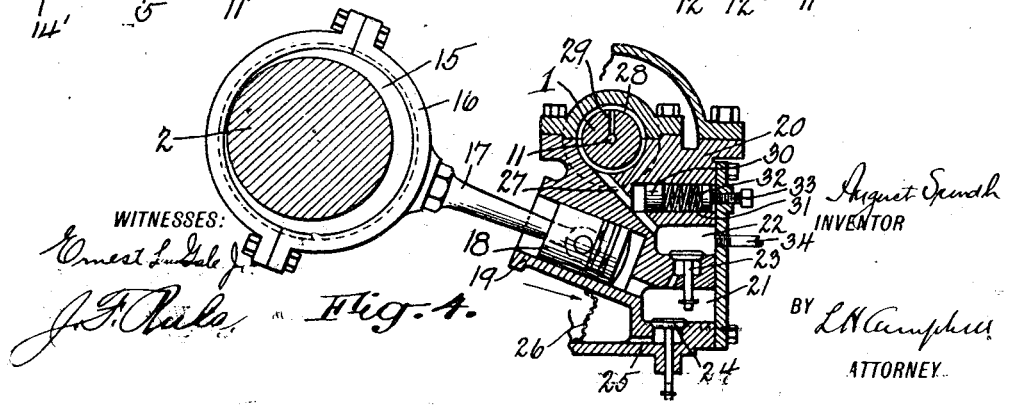
WITNESSES:
August Sundh
INVENTOR
BY L. H. Campbell
ATTORNEY

UNITED STATES PATENT OFFICE.

AUGUST SUNDH, OF HASTINGS-UPON-HUDSON, NEW YORK.

LUBRICATING MECHANISM.

1,132,748.   Specification of Letters Patent.   Patented Mar. 23, 1915.

Application filed April 4, 1912. Serial No 688,381.

*To all whom it may concern:*

Be it known that I, AUGUST SUNDH, a citizen of the United States, residing at Hastings-upon-Hudson, in the county of Westchester and State of New York, have invented a new and useful Improvement in Lubricating Mechanism, of which the following is a specification.

My invention relates to power transmission mechanism.

Among the objects of the invention are to provide a practically noiseless form of spur gearing, which shall be self-adjustable within certain limits, and to provide means for automatically lubricating the various parts of the apparatus.

The exact nature of the invention will appear more fully hereinafter.

Referring to the accompanying drawings, Figure 1 is a part sectional plan view of mechanism embodying my invention, the gear section of the gear inclosing casing being removed to more clearly show the apparatus; Fig. 2 is a part sectional elevation of one of the gear pinions; Fig. 3 is a sectional side elevation of the same; Fig. 4 is a sectional elevation view as indicated by the section line 4—4 of Fig. 1, and shows a pumping apparatus for circulating a lubricating fluid.

The power transmission gearing is located within a casing C, and comprises shafts 1 and 2 journaled in the side walls of the casing, which shafts may conveniently be termed the drive shaft and driven shaft, respectively. Mounted on, or formed integral with the drive shaft, are spur gear pinions 3 which mesh with gear wheels 4 on the driven shaft 2. The drive shaft 1 is adapted to be connected to any suitable source of power such as an electric motor or a gas engine, the power being transmitted through the gears 3 and 4 and operating the driven shaft 2 at a reduced speed. The shaft 2 may be connected to any desired driven mechanism. It will be understood of course that the shaft 2 may be used as a drive shaft, and power transmitted therefrom to the shaft 1, which will then form a driven shaft. Each gear wheel 3 comprises an inner member or hub 5 which, as shown, is formed integral with the shaft, and an outer annular member 6 formed with spur gear teeth 7. Between the members 5 and 6 is interposed an intermediate element 8 consisting of a strip or band of metal such as steel which may be wound in one or more layers in the clearance space between the members 5 and 6. This feature of construction is fully set forth and claimed in my patent for gearing, No. 1,017,819, February 20, 1912, and need not be further described herein, except to state that it forms a yielding or flexible connection, permitting a limited self adjustment of the gears. The outer member 6 is held against displacement in a longitudinal direction by means of rings 9 secured to the gears by bolts 10. The construction of the gear wheels 4 may be substantially the same as that of the gear pinions 3.

In order to permit the circulation of a lubricating fluid through the gearing, the shaft 1 is made hollow or formed with a central bore 11. Radial openings or passages 12 extend from the opening 11 outwardly through the parts 5 and 8 of the gears and communicate with an annular recess or passage 13 formed in the gear member 6. The latter is also provided with radial openings 14 extending therethrough from points between the gear teeth to the annular groove 13. Similar openings 14' extending through any desired number of the gear teeth 7 may also be provided if desired.

Within the casing C is a light oil or other suitable lubricating material, adapted to be circulated by means of the pump shown in Fig. 4. This pump comprises an eccentric 15 on the shaft 2, an eccentric strap 16 to which is secured a piston rod 17, a piston 18 pivotally connected to the rod 17, and a piston cylinder 19. The cylinder 19 as shown is formed in a block 20 connected to or formed integral with the casing and which block also forms a central bearing for the shaft 1. The block 20 is formed with a chamber 21 communicating with the cylinder 19 and a chamber 22. A check valve 23 controls a port between said chambers and permits a free circulation of liquid from the chamber 21 to the chamber 22, but prevents a return flow of the liquid. A check valve 24 permits liquid to be drawn from the casing C through a port 25 into the chamber 21. A screen 26 prevents dirt or any foreign matter being drawn in and circulated by the pump. The chamber 22 communicates through a passage 27 with an annular recess 28 surrounding the shaft 1. A radial opening 29 in the shaft 1 establishes communication between said annular recess and the central opening 11 of the shaft.

In operation, the rotation of the shaft 2 reciprocates the pump piston 18. As the piston moves outward in its cylinder, the lubricant is drawn past the check valve 24 into the chamber 21. The return movement of the piston forces the lubricant past the valve 23 into the chamber 22, and from thence through the passages 27, 28, 29, 11, 12, 13 and 14, back into the casing. A portion of the lubricating fluid circulated through the annular passage 28 is distributed over the central bearing of the shaft 2 and keeps it constantly lubricated. A portion of the oil passing through the radial openings 12 into the annular slot 13 is distributed over the contacting surfaces of the gear members 5, 6 and 8, so that any adjustment or relative movement of said members can take place without undue friction, wear or noise. The oil passing through the openings 14 maintains the gear teeth constantly lubricated. A cushioning device to maintain a practically constant pressure on the circulating lubricant comprises a piston 30 working in a cylindrical chamber 31. A coil spring 32 is located in said chamber between the piston and an adjusting device 33. The operation of this cushioning device to prevent any undue pressure on the circulating lubricant as the pump piston 18 moves inward, and to maintain a practically constant pressure while the check valve 23 is closed, is obvious. In order to automatically lubricate the bearings for the shafts 1 and 2, additional means for conveying the circulating liquid is provided comprising a pipe 34 extending from the chamber 22 and pipes 35 and 36 extending to the shaft bearings. A portion of the liquid circulated by the pump flows through these pipes to keep the shaft bearings continually lubricated.

I wish not to be limited to the exact features of construction herein disclosed, as my invention comprises such modifications as might be made within the scope of the appended claims.

What I claim is:

1. In power transmitting mechanism, the combination of a self alining gear comprising an inner member, and outer member, and an intermediate laminated section, a passage extending through one of said members to said laminated section, and a pump for the purpose of conveying lubricating material under pressure to the latter through said passage.

2. A gear wheel comprising inner and outer members and an intermediate portion flexibly connecting said members, said outer member being formed with a passage extending inward to said intermediate portion for the circulation of a lubricant, and a pump adapted to force a lubricant through said passage.

3. A self alining gear wheel having inner and outer members and a laminated intermediate section yieldingly connecting said members, the inner member having a central bore, and said members being formed with radial passages from the central opening to the intermediate section and from said section to the outer surface of the gear wheel.

4. A gear wheel comprising inner and outer members, and an intermediate connecting member, said wheel being provided with an axial bore or opening and radial passages extending therefrom to the connecting member for the passage of lubricating material.

5. A gear comprising an inner member and an outer annular member adapted to have a limited relative movement, a passage in one of said members for conveying a lubricant between said members, and a force pump discharging into said passage.

6. A gear comprising an inner member, an annular member surrounding the inner member, a power transmitting medium interposed between said members, a passage through the interior of the inner member in communication with the contacting surfaces of said parts and adapted to convey a lubricant to the latter, and a force pump discharging into said passage.

7. A gear comprising inner and outer members, and material forming an elastic connection between said members, said gear being formed with passages through the inner member for conveying lubricating material to the contacting surfaces of said parts, and means for forcing lubricating material into said passages.

8. A gear comprising a hub member having a corrugated surface, an annular member surrounding the same and having an opposing corrugated surface, sheet metal interposed between said surfaces, said hub member being provided with a central axial bore and radial passages extending therefrom to said surfaces.

9. A gear comprising inner and outer members, and a power transmitting medium interposed between said members, the inner member being formed with passages to transmit lubricating material to said medium and the said outer member being formed with one or more passages extending from said medium to the outer surface of the gear.

10. A gear comprising an inner member and an annular outer member, said members being formed with non-circular opposing faces, power transmitting material interposed between said opposing faces, said inner member being formed with passages leading to said faces and said annular member being formed with a groove or passage surrounding said material and radial openings extending from said annular passage through the outer member.

11. The combination of a spur gear wheel having an axial opening and passages leading therefrom to the outer surface of the gear wheel, a fluid pressure device independent of said gear wheel, and means to direct a lubricating fluid from the pressure device to said axial opening 12. The combination of a spur gear wheel comprising inner and outer members and intermediate flexible means to form a self alining gear wheel, said wheel being provided with a central opening, radial openings extending therefrom to the said intermediate means, and radial openings from said intermediate means to the outer surface of the gear wheel, and a fluid pressure device communicating with said openings whereby a lubricant may be applied to the said intermediate means and the bearing surfaces of the gear teeth.

13. The combination of a spur gear wheel comprising relatively movable inner and outer members and an intermediate laminated section of sheet metal, and means to maintain a continuous circulation of a lubricating material through the gear and in contact with the coöperating surfaces of said members and laminated section.

14. A spur gear wheel comprising inner and outer relatively movable members, the inner member being provided with an axial opening and radial passages extending from said opening, and the outer member being provided with radial passages some of which are out of alinement with said first named passages.

15. The combination of a spur gear wheel comprising inner and outer members and an intermediate section movable relatively to said members to form a flexible gear wheel, the inner member being formed with an axial opening and radial passages extending therefrom to the said intermediate section, the outer member being provided with radial passages some of which are out of alinement with said first named passages, and means to circulate a lubricant through said opening and radial passages.

16. A spur gear wheel consisting of an inner member, an outer member, and laminations between said members to make the gear self alining, and means dependent upon the rotation of said gear to lubricate said laminations under pressure.

17. A spur gear wheel comprising an inner member, an outer member, and laminations between said members, and means dependent upon the rotation of said gear to forcibly lubricate the surfaces inside and outside of said laminations.

18. The combination of a shaft formed with a central axial opening, a bearing for said shaft, said shaft and bearing being formed to provide an annular passage surrounding the shaft, said shaft having an opening extending from said passage to said central opening, a gear wheel mounted on said shaft, passages extending radially through the shaft and gear wheel for the circulation of a lubricating fluid, a pump and means for directing the lubricating fluid from the pump to said annular passage.

19. The combination of a driving pinion comprising means to permit self alinement of the pinion, and means dependent upon the rotation of said gear to supply lubricating material under pressure to said first named means.

20. The combination of a driving pinion comprising relatively movable parts arranged to form a yielding self alining pinion, and ports or passages in each of said parts for permitting the flow of lubricant thereto, and means for forcing lubricating material into said passages.

21. The combination of a driving pinion comprising relatively movable parts, means to form a yielding connection between said parts, permitting self alinement of the pinion, and means operative upon a rotation of the pinion to force lubricating material into said connecting means and thereby prevent wear and maintain the flexibility of the pinion.

In testimony whereof, I have signed my name to this specification in the presence of two subscribing witnesses.

AUGUST SUNDH.

Witnesses:
JAMES G. BETHELL,
J. F. RULE.